United States Patent
Gullicksen et al.

(10) Patent No.: US 6,370,114 B1
(45) Date of Patent: Apr. 9, 2002

(54) APPARATUS AND METHOD FOR OPTIMIZING CONGESTION CONTROL INFORMATION IN A MULTI-PROTOCOL NETWORK

(75) Inventors: Jeffrey T. Gullicksen, Santa Clara; Greg M. Bernstein, Fremont; Gurpreet S. Chhabra, Sunnyvale, all of CA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/001,666

(22) Filed: Dec. 31, 1997

(51) Int. Cl.[7] .............................................. G01R 31/08
(52) U.S. Cl. ....................... 370/229; 370/230; 370/395
(58) Field of Search ................................. 370/229, 230, 370/231, 232, 233, 235, 236, 237, 395, 396, 252, 253, 419, 420, 463, 409, 410, 465, 460, 474, 332, 545

(56) References Cited

U.S. PATENT DOCUMENTS

| 5,163,046 A | * | 11/1992 | Hahne | 370/409 |
| 5,701,292 A | * | 12/1997 | Chiussi | 370/232 |
| 5,905,711 A | * | 5/1999 | Chiussi | 370/232 |
| 5,940,370 A | * | 8/1999 | Curtis | 370/231 |
| 6,021,116 A | * | 2/2000 | Chiussi | 370/236 |
| 6,130,880 A | * | 10/2000 | Naudus | 370/235 |
| 6,157,613 A | * | 12/2000 | Watanabe | 370/229 |

FOREIGN PATENT DOCUMENTS

WO    WO 97/45978 A    12/1997

OTHER PUBLICATIONS

Ott, Tennis J. and Aggarwal, Neil, "TCP over ATM: ABR or UBR?," Jun. 15, 1997, pp. 52–63.

* cited by examiner

Primary Examiner—Douglas Olms
Assistant Examiner—Ricardo M. Pizarro
(74) Attorney, Agent, or Firm—Finnegan, Henderson, Farabow, Garrett & Dunner, L.L.P.

(57) ABSTRACT

The benefits of Transport Control Protocol (TCP) over Available Bit Rate (ABR) Service of an Asynchronous Transfer Mode (ATM) network is extended to the entire TCP connection by intercepting and modifying TCP congestion control information in accordance with resource information associated with the TCP connection. An algorithm calculates a new advertised window size based on various network resource parameters, such as ABR. The advertised window is adjusted if the newly calculated window size is smaller than the advertised window size. By adjusting the TCP window, the normal extreme fluctuations of the TCP window are avoided.

47 Claims, 8 Drawing Sheets

APPARATUS AND METHOD FOR OPTIMIZING CONGESTION CONTROL INFORMATION IN A MULTI-PROTOCOL NETWORK

BACKGROUND OF THE INVENTION

A. Field of the Invention

The present invention relates generally to digital networks, and in particular to apparatus and methods for increasing throughput in a connection carried at least partially over an asynchronous transfer mode (ATM) network.

B. Description of the Prior Art

Data transported over a connection frequently crosses several networks, each having a different protocol. The source and destination nodes may employ one protocol, such as Transport Control Protocol (TCP), and a network linking the nodes travels may employ another, such as ATM.

As networks become congested, net throughput decreases. Constant efforts have been made to increase connection throughput and correspondingly decrease network congestion. Moderate increases in throughput are attributable to new congestion avoidance algorithms serving as part of a protocol used to implement a connection. For example, TCP uses a congestion window algorithm to alter source to destination data transfer, and ATM has a variety of services, such as Available Bit Rate Service (ABR), to optimize throughput over a connection. When TCP is carried over ABR, this is referred to as "TCP over ABR."

Using TCP over ABR increases throughput dramatically. The increased throughput, however, is only realized over ATM networks. Therefore, the advantages are only realized when both source and destination are connected over a pure ATM connection. When a TCP connection is partially carried through an ATM network and partially over a non-ATM network, such as an Ethernet LAN, the non-ATM network can become a bottleneck to the overall connection throughput. This is because the TCP congestion window algorithm does not optimize throughput as much as possible. Therefore, even though TCP over ABR raises throughput on the ATM portion of the connection, increased throughput is not realized over the non-ATM portion of the connection.

Figure 1:
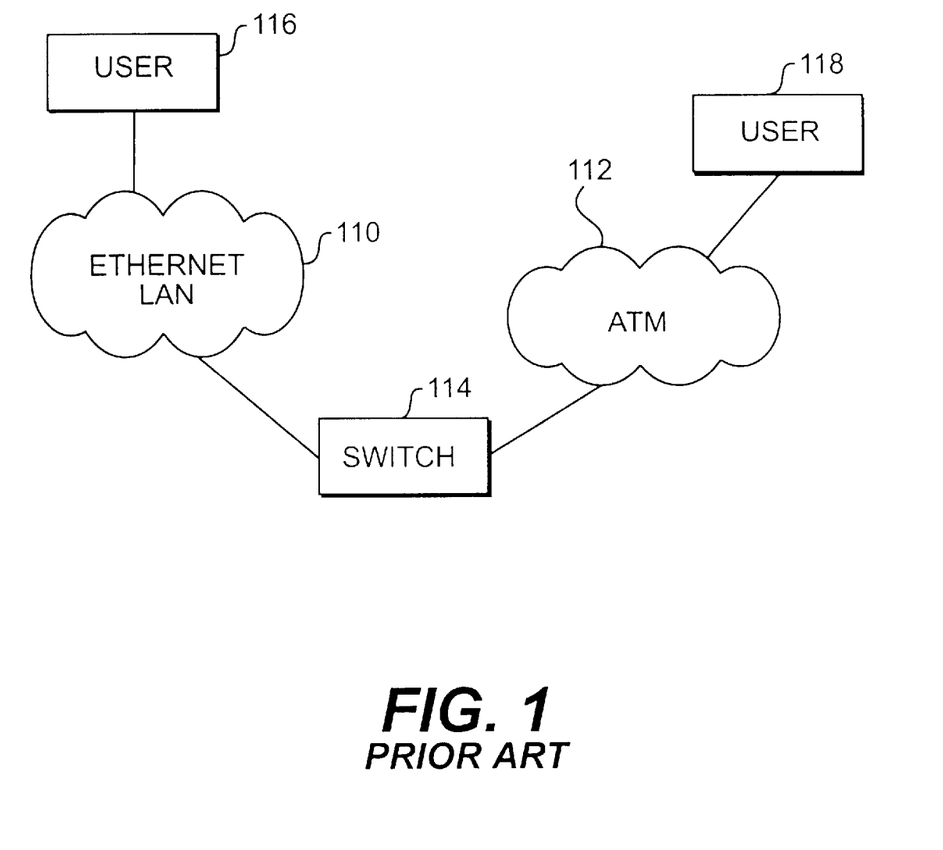
FIG. 1 is a block diagram showing a prior art network architecture in which methods and apparatus consistent with the present invention may be practiced.

FIG. 1 is a block diagram showing a prior art network architecture. Ethernet local area network (LAN) 110 is connected to switch 114 and user 116, and ATM network 112 is connected to switch 114 and user 118. The architecture supports communications between user 116 and user 118.

In a typical connection, several protocols may be used simultaneously for a connection between user 116 and user 118. One common combination of protocols is the combined use of TCP and ATM. TCP is a protocol for transporting a byte stream between pairs of hosts, such as user 116 and user 118. ATM is a high bandwidth transmission technology over which TCP connections can be transferred. A TCP byte stream is packetized according to the ATM protocol, transported over the ATM network, depacketized, and reassembled into the original TCP byte stream at the other end.

Figure 2:
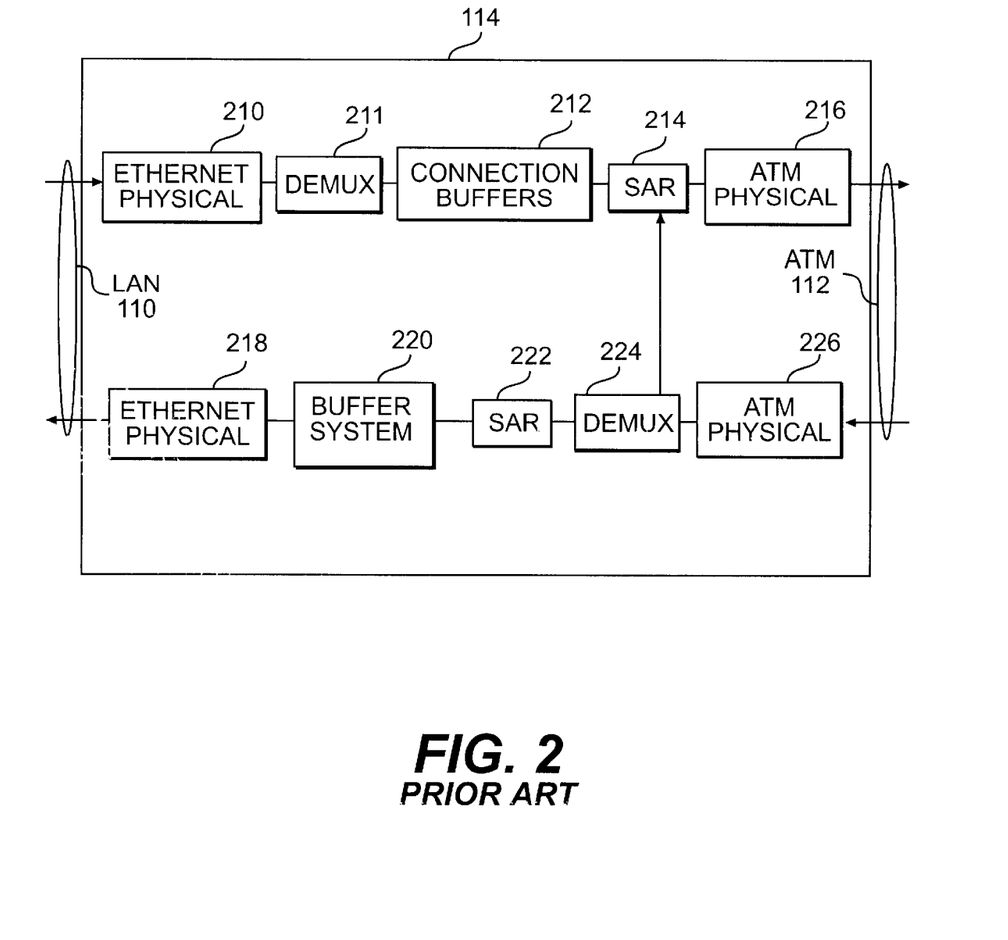
FIG. 2 is a block diagram of a prior art switch for transferring data between an Ethernet LAN and an ATM network.

FIG. 2 is a block diagram showing a conventional switch which may be used as switch 114 of FIG. 1. Switch 114 receives TCP data from Ethernet LAN 110, packetizes the data into ATM data, and depacketizes ATM data from an ATM network into TCP data. Switch 114 is connected to LAN 110 via Ethernet physical interfaces 210 and 218. Data coming from LAN 110 into switch 114 is transferred from Ethernet physical interface 210 to demux 211. Demux 211 associates TCP connections with ATM connections by demultiplexing the TCP data stream into connection buffers 212. Data is then transferred from connection buffers 212 into segmentation and reassembly processor (SAR) 214. Finally, the data is transferred to ATM network 112 by ATM physical interface 216.

In the opposite direction, data is received from ATM network 112 by ATM physical interface 226. ATM physical interface 226 transfers the data through Resource Management (RM) cell demultiplexer 224 to SAR 222, which in turn transfers the data to buffer system 220. Finally, the data is transferred from buffer system 220 to Ethernet physical interface 218, which transfers the data to Ethernet LAN 110.

RM cell demultiplexer 224 extracts RM cells from the incoming ATM data stream and transfers them to SAR 214. RM cells are used in ATM to transfer information regarding resources on the ATM network. For example, RM cells may be used to transfer congestion information. RM cells also include ATM information that identifies the particular connection the resource information is associated with. In response to congestion information in the RM cells, SAR 214 adjusts its output in accordance with the ABR service used on the ATM connection.

ATM supports four service categories that have a variety of performance levels: Constant Bit Rate (CBR), Variable Bit Rate (VBR), Available Bit Rate (ABR), and Unspecified Bit Rate (UBR).

ABR service in ATM networks is primarily used for the transport of best effort data services. ABR sessions share the network bandwidth left over after serving CBR and VBR traffic. This available bandwidth varies with the requirements of the ongoing CBR/VBR sessions by providing rate based feedback in RM cells to the switches carrying ABR sessions. Because TCP is currently the predominant data transport protocol that applications run on over the Internet, TCP traffic is a likely candidate to be carried over the ABR service category.

Data is transferred over ATM network 112 using virtual connections. A virtual connection receives data to be transferred, packetizes the data, transmits the packets over any available path toward the destination, reassembles the packets into the order in which they were transferred, and finally transmits the original data that is transferred. The ATM protocol manages the virtual connection to ensure that data being transferred is reassembled in the same order it was sent. From the user's standpoint, the virtual connection appears like a physical connection because data is received in the same order it was sent.

Each virtual connection is routed through the network and includes a forward path (from source to destination) and a backward path (from destination to source). For both bidirectional point-to-point and point-to-multipoint connections, the forward and backward components of a virtual connection use the same connection identifiers, and pass through identical transmission facilities.

A source for the ABR service can submit cells into the network at a variable but controlled or shaped rate. SAR 214 performs this function. The ABR source and destination forms an ABR control loop: the ABR source transmits cells for conveying feedback information towards the destination and the destination returns them towards the source.

The ABR service uses RM cells to provide network congestion information to SAR 214. In particular, SAR 214 reduces or increases cell transmission rates depending on the availability of bandwidth in the network as indicated by the RM cells.

Congestion feedback information is used by switch 114 to respond to changes in the available bandwidth by appropriately modifying submission rates of data being transmitted onto ATM 112. This controls or avoids congestion, and the available bandwidth is used.

For ABR connections, the source creates a connection with a call setup request. During this call setup, the values for a set of ABR-specific parameters are identified. Some values are requested by the source and may be modified by the network (e.g., the lower and upper bounds on the source rate), while other values are directly chosen by the network (e.g., the parameters characterizing the process for dynamically updating rates).

Once the source has received permission, it begins cell transmission. The rate at which an ABR source is allowed to schedule cells for transmission is denoted by the Allowed Cell Rate (ACR). In ABR, ACR is initially set to the Initial Cell Rate (ICR), and is always bounded between the Minimum Cell Rate (MCR) and the Peak Cell Rate (PCR). Transmission of data cells is preceded by the sending of an ABR RM cell. The source rate is controlled by the return- of these RM cells, which are looped back by the destination or by a virtual destination.

An RM cell includes several fields, as is well understood in the art. The source places the rate at which it is allowed to transmit cells (its ACR) in the Current Cell Rate (CCR) field of the RM cell, and the rate at which it wishes to transmit cells (usually the PCR) in the Explicit Rate (ER) field. The RM cell travels forward through the network, thus providing the switches in its path with the information in its content for their use in determining the allocation of bandwidth among ABR connections. Switches also may decide at this time to reduce the value of the explicit rate field ER, or set the Congestion Indication bit CI to 1.

Switches optionally generate a controlled number of RM cells on the backward path, in addition to those originally supplied by the source. Switch-generated RM cells preferably has the Backward Notification (BN) bit set to 1 and either the CI bit or the No Increase (M) bit set to 1.

When the cell arrives at the destination, the destination changes the direction bit in the RM cell and return the RM cell to the source. If the destination is congested and cannot support the rate in the ER field, the destination reduces ER to whatever rate it can support.

As the RM cell travels backward through the network, each switch may examine the cell and determine if it can support the rate ER for this connection. If ER is too high, the switch reduces it to the rate that it can support. No switch should increase the ER, since information from switches previously encountered by the RM cell then would be lost. The switches only modify the ER for those connections for which it is a bottleneck, since this promotes a fair allocation of bandwidth. Also, switches modify the ER content of the RM cells traveling on either their forward or backward journeys, but not on both.

Returning to FIG. 2, when the RM cell arrives back at the source, SAR 214 resets its rate, ACR, based on information carried by RM cells. The ABR service may also provide for numerous other adjustments in the source to destination flow control.

A primary motivation for ABR is economical support of data traffic, where each packet of data is segmented into ATM cells, the loss of any one of which causes the re-transmission of the entire packet by a higher protocol layer. By adjusting transmission rates based on feedback from the network to the traffic source, cell loss is controlled within the network. The ABR service guarantees a particular cell-loss ratio for all traffic offered in proper response to network feedback.

TCP Congestion Control

In addition to the rate-based ABR service provided by ATM networks, service quality is also enhanced by higher layer protocols of the network. TCP provides a windowing mechanism which adapts to changes in the network by changing the flow of a TCP connection. A TCP window, which defines an amount of data which can be sent, changes in proportion to acknowledgments per unit time received from remote sites. If acknowledgments are received slowly, the window decreases and transmission slows down. If acknowledgments are received quickly, the window increases and transmission speeds up.

The TCP window defines the amount of outstanding data a sender can send on a particular connection before it gets an acknowledgment back from the receiver. A sliding window algorithm is often used to control flow for network data transfers. When TCP is used for transferring data over the Internet, a sliding window algorithm is used. The sliding window is implemented as a variable-sized buffer between the application program and the network data flow. For TCP, the buffer is typically in the operating system kernel, such as in user 116, but may be implemented elsewhere in the network.

A primary purpose of the sliding window is congestion control. The network connection, which consists of the hosts at both ends, the routers in between, and the actual connections themselves, will have a bottleneck somewhere that can only handle data so fast. If transmission occurs too fast, a bottleneck will not transmit data fast enough and data will be lost. The TCP window throttles the transmission speed down to a level where congestion and data loss do not occur.

Each TCP connection has a TCP transmitter and a TCP receiver, such as user 116 and user 118, respectively, of FIG. 1. The transmitter dynamically adjusts its window size in response to information received from the TCP receiver. The receiver advertises a maximum window beyond which the transmitter's window cannot increase. When any packet is lost or damaged, the receiver does not acknowledge that packet, causing the transmitter to retransmit the packet.

Congestion is detected in TCP by detecting packet loss resulting from buffer overflow at an intermediate node, or by detecting delayed packets or acknowledgments (ACKs) caused by congestion that in turn causes TCP timeout. In either case, the window drops to one to reduce the load on the network.

Figure 3:
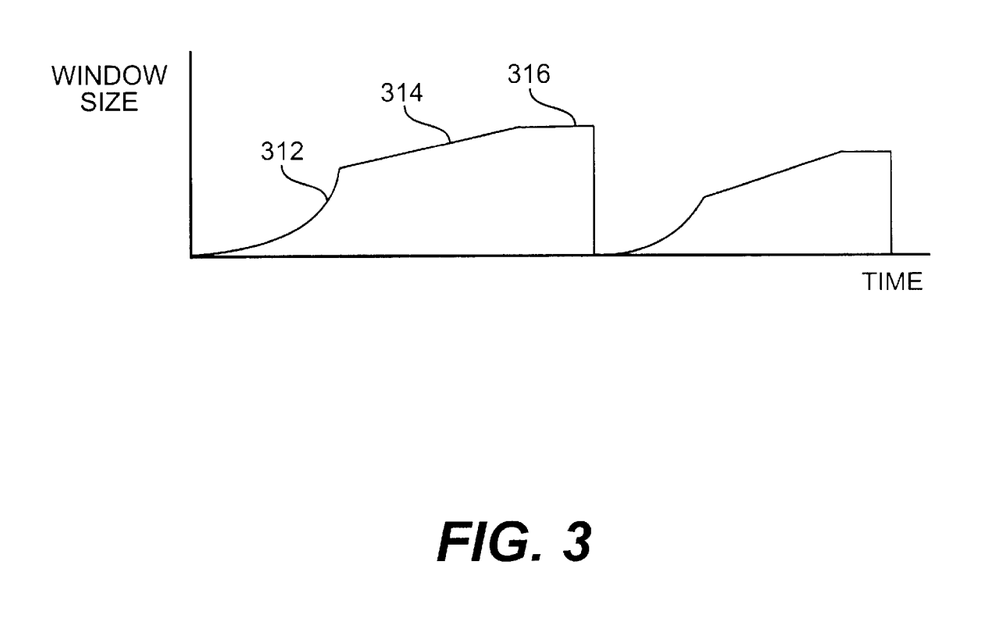
FIG. 3 is a chart showing the typical window size fluctuations when using TCP.

FIG. 3 is a chart showing the fluctuations of a prior art TCP congestion window using a typical TCP sliding window algorithm. The sliding window algorithm is not efficient. The window size hunts around an "optimum" window size, but always overshoots. This results in packet loss, followed by a reduction in the window size.

FIG. 3 shows two complete cycles of the transmitter window adapting in three separate phases over time. In the slow start phase (312), the TCP transmitter window increases by 1 every time a packet is acknowledged. Therefore, the window doubles every round trip time. This phase continues growing exponentially until the window reaches a threshold. The congestion avoidance phase (314) follows the slow start phase (312). The window grows more slowly than in the slow start phase. Each time a packet is acknowledged, the window grows by $1/W_t$, where $W_t$ is the current window size each round trip time. This phase continues until loss occurs, or the window reaches its maximum possible value.

The third and final phase is the loss recovery phase (316). When loss occurs, if packets succeeding the lost packet successfully reach the receiver, the receiver accepts the out-of-sequence packets, but continues to send ACK packets requesting the first lost packet. Therefore, the transmitter window does not grow. The transmitter window slowly becomes empty, and the transmitter starts a timeout clock. At the end of the timeout, advertised window sized drops to zero, and the threshold window $W_t^{th}$ is set to half the current window size, i.e.

$$W_t^{th} = \frac{w_t^-}{2}.$$

Then the next slow start phase begins with $W_{t+}=1$.

The algorithm is useful because it dynamically alters the sender window size in response to congestion information from the receiver. The window adjustments, however, are so extreme that some bandwidth may be wasted. The window size does not closely follow actual fluctuations in congestion of the network. Notably, when the TCP protocol times out, the severe drop preferably reduces the window well below its optimum size.

TCP Over ABR/ATM

The adaptive window congestion control mechanism of TCP that slows down the source during network congestion interacts beneficially with the rate-based explicit feedback control of ABR service from the point of the application level throughput. In TCP over ABR, ABR service works in conjunction with the flow control of TCP to optimize flow on the network. On a lightly loaded network, data is transmitted at the full speed of the line rate. On the other hand, if the network is heavily loaded, switch 114 receives ABR feedback RM cells that indicate congestion, and slows down data transmission in response.

Bandwidth for each virtual ABR connection must fall between a minimum cell rate and peak cell rate. The network provides information about the bandwidth available to the virtual connection through the ABR feedback mechanisms.

Returning to FIG. 2, TCP packets are converted to ATM cells and forwarded to SAR 214. The segmentation buffer receives rate feedback RM cells from the network and the ATM cells are transmitted by SAR 214 at a rate proportional to the rate feedback.

The throughput of TCP traffic can be increased by up to 40% if it is carried over available bit rate ABR end to end. Most users, however, are not connected to an ATM network, but rather to a non-ATM network, such as an Ethernet LAN, as shown in FIG. 1. Therefore, the user does not realize the benefits of using TCP/ABR.

In TCP over ABR, when the feedback loop has a fixed delay, then the ABR source of a session follows the variations in the bandwidth of the bottleneck link without delay. As a result, there is no loss in the network. The TCP window grows until it reaches the maximum window size.

Once the TCP window size exceeds the optimal window size for the connection the packets are buffered in the source buffer. Consequently, congestion is effectively pushed to the network edge. Because the source buffer is much larger than the maximum window size, the TCP window remains fixed at the maximum window size and congestion control will become purely rate-based. Once the ABR control loop converges, no loss will take place in the network and congestion will be pushed to the network edge. If ABR service was not used, however, TCP increases its window, overshoots the optimum window size, and then reduces the window size due to packet loss.

In TCP over ABR, both ABR feedback and TCP congestion control adjust flow control on the network. In this case, the TCP layer in the source host sends TCP packets into the ATM connection buffers 212 where the TCP packets are converted into ATM cells. At time t, the cells are transmitted at a time dependent rate, which depends on the ABR rate feedback indicated by the RM cells. The bottleneck has a finite buffer and has time dependent service rate. If the buffer is full when a cell arrives, the cell is dropped. On the other hand, if the buffer is not full and the packet is not lost, it gets serviced and reaches the destination after some deterministic delay. The destination ATM layer reassembles the packet and delivers it to the TCP receiver. The TCP receiver responds with an ACK which, after some delay (propagation+processing delay) reaches the source. The TCP source responds by increasing the window size.

In the network architecture shown in FIG. 1, user 116 is connected to LAN 110. LAN 110 serves as the last hop to the workstation on one side, and as the connectivity point to ATM network 112 on the other. Therefore, there is a level of indirection between the user and the ATM network. This is the current state of the technology. Because of this indirection, however, the user does not reap the benefits of the application level throughput optimization offered in TCP over ABR as when only an ATM network is involved.

Therefore, there is a need to extend the benefits realized by TCP over ABR to connections carried over ATM and non-ATM networks.

II. SUMMARY OF THE INVENTION

Apparatus and methods consistent with the present invention relate to increasing network throughput over connections employing two or more protocols. More particularly, apparatus and methods consistent with the present Invention increase throughput over connections employing an Asynchronous Transfer Mode (ATM) protocol network and a non-ATM protocol network.

To achieve the objects and in accordance with the purpose of the invention, as embodied and broadly described herein, the invention comprises a method of receiving first congestion information defined by the first protocol; receiving network resource information, wherein the network resource information is not used to determine the first congestion information; determining second congestion information based on network resource information; and transmitting one of the first and second congestion information.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate an embodiment of the invention, which, together with the description, serve to explain the principles of the invention.

IV. DETAILED DESCRIPTION OF THE PREFERRED EMBODIMENTS

Reference will now be made in detail to a preferred embodiment consistent with the principles of the invention, an example of which is illustrated in the accompanying drawings. Wherever possible, the same reference numbers are used throughout the drawings to refer to the same or like parts.

TCP over ABR has been shown to increase throughput up to 40%. Methods and apparatus consistent with the present invention allow TCP users on standard LANs to reap the benefits of TCP over ABR when their connection is carried partially over an ATM network and partially over a non-ATM network. Benefit is reaped when the ATM link is the bottleneck.

LAN is used in its generic form to describe any LAN other than an ATM-emulated LAN. In an emulated LAN (ELAN), the LAN portion is the last hop to the workstation which is generally switched Ethernet. In a pure ATM-emulated LAN, this invention does not apply because every node on the ELAN is ATM connected and thus can use TCP over ABR.

Apparatus and methods consistent with the present invention extend the benefits of TCP over ABR to a user having connections at least partially carried over an ATM network. An example of such a network is shown in FIG. 1. Methods and apparatus consistent with the invention modify congestion information to be sent to the source so that the benefits of TCP over ABR are extended, even though the entire connection is not carried over ATM networks. This is done without altering the TCP protocol and, therefore utilizes TCP in a manner consistent with the TCP standards.

In TCP a receiver advertises its window size, that is, the number of bytes it can accept. The source can then adjust its transmit window size based on the window advertised by the receiver.

One fundamental aspect of apparatus and methods consistent with the principles of the present invention is the interception of each packet from the far end TCP receiver and adjustment of its advertised TCP window size based on the rate available for that connection and the space available in the buffer for the connection. In the case where the ATM link is the bottleneck, the sending source is quenched at the source. If the ATM portion is not the bottleneck, then native TCP congestion control is used.

Figure 4:
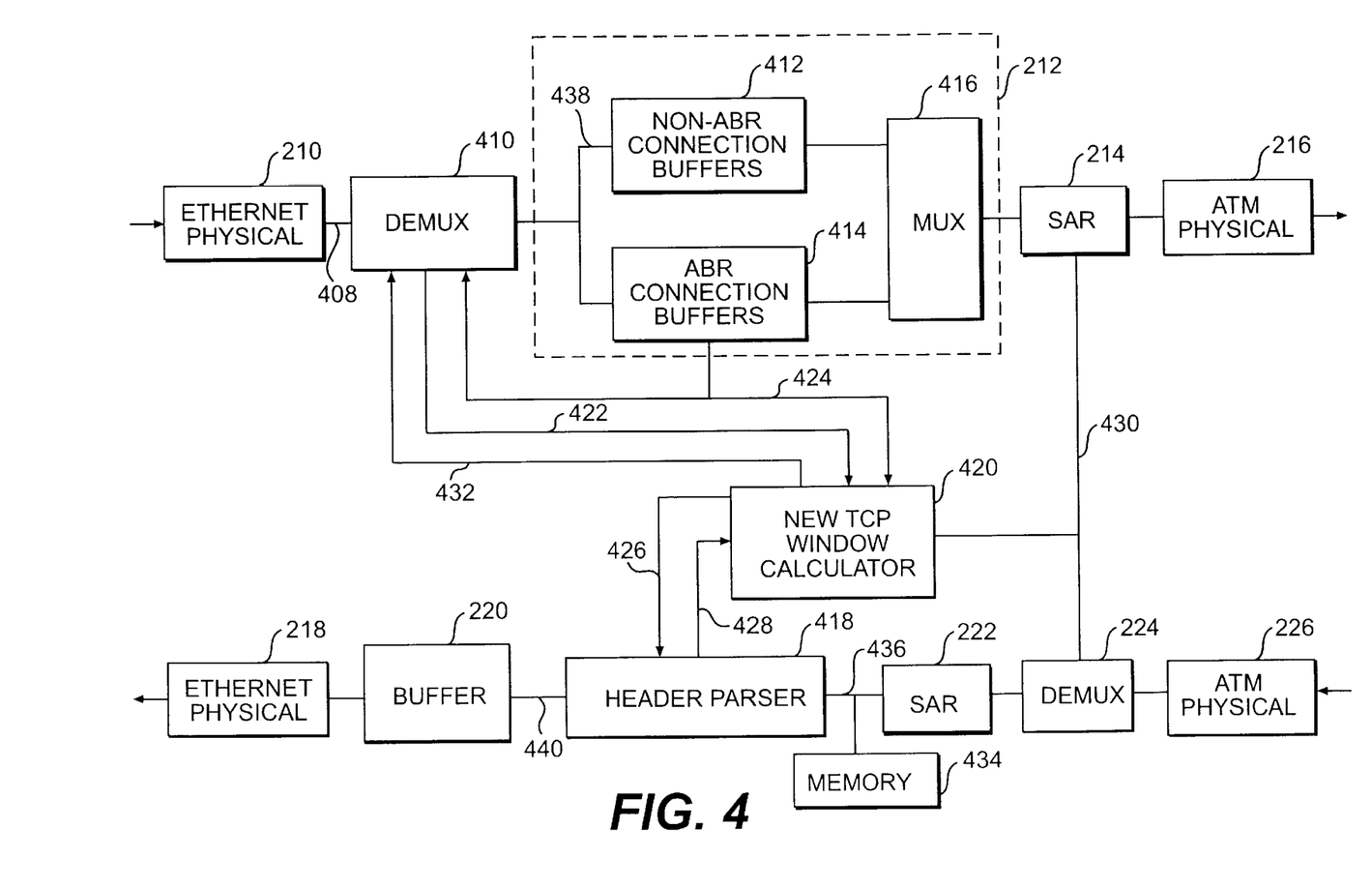
FIG. 4 is a block diagram of a system consistent with the present invention.

FIG. 4 is a block diagram showing a preferred embodiment of the apparatus in accordance with the principles of the present invention. Ethernet physical interface 210, SAR 214, ATM physical interface 216, Ethernet physical interface 218, buffer system 220, SAR 222, and ATM physical interface 226 are similar to the corresponding elements of FIG. 2. SAR 222 reassembles incoming data and stores it in memory 434. The apparatus of FIG. 4, for example, may be substituted for switch 114 in the network shown in FIG. 1.

Demux 410 associates TCP and ATM connections and transfers the incoming data stream into connection buffers 212 via path 438. Connection buffers 212 comprises non-ABR connection buffers 412 and ABR connection buffers 414. The non-ABR connection buffers 412 and ABR connection buffers 414 are multiplexed into a single stream by multiplexer 416 and transferred to SAR 214 for transmission onto the ATM network via ATM physical interface 216.

New TCP window calculator receives a variety of information that may be used in calculating a new TCP window. Demux 410 sends Ethernet rate information for each connection to new TCP window calculator 420 via path 422. ABR connection buffers 414 sends buffer fill and buffer size information for each connection to new TCP window calculator 420 via path 424. A return path from non-ABR connection buffers 412 to demux 410 for buffer fill and buffer size is not shown. New TCP window calculator 420 also receives advertised window size information, $W_{advertised}$, from header parser 418 via path 428.

New TCP window calculator 420 receives RM cells from demultiplexer 224, and extracts the connection identification and congestion information from the RM cell. Based on the connection information, the TCP window calculator knows which connection the TCP window information received from header parser 418 via path 328 is being carried on. Consequently, new TCP window calculator 420 can use congestion information unique to the connection carrying a particular TCP connection to determine the optimum window size.

From the Ethernet rate, buffer fill information, buffer size information, RM cell congestion information, and advertised window size, new TCP window calculator 420 calculates an optimized TCP window size. The new TCP window is optimized based on network availability and switch information that is not used in the TCP protocol. Consequently, the TCP window more accurately reflects the overall flow of data and is optimized for the TCP connection. Because the TCP window is optimized based on the parameters of the connection, and the connection is optimized because of the efficiencies of TCP over ABR, the overall TCP connection is optimized.

The packet with new window and checksum information is transferred to buffer system 220 via path 440, and then to the Ethernet via Ethernet physical interface 218. The TCP source receives the modified window and responds by sending data in accordance with the new window.

Figure 5:
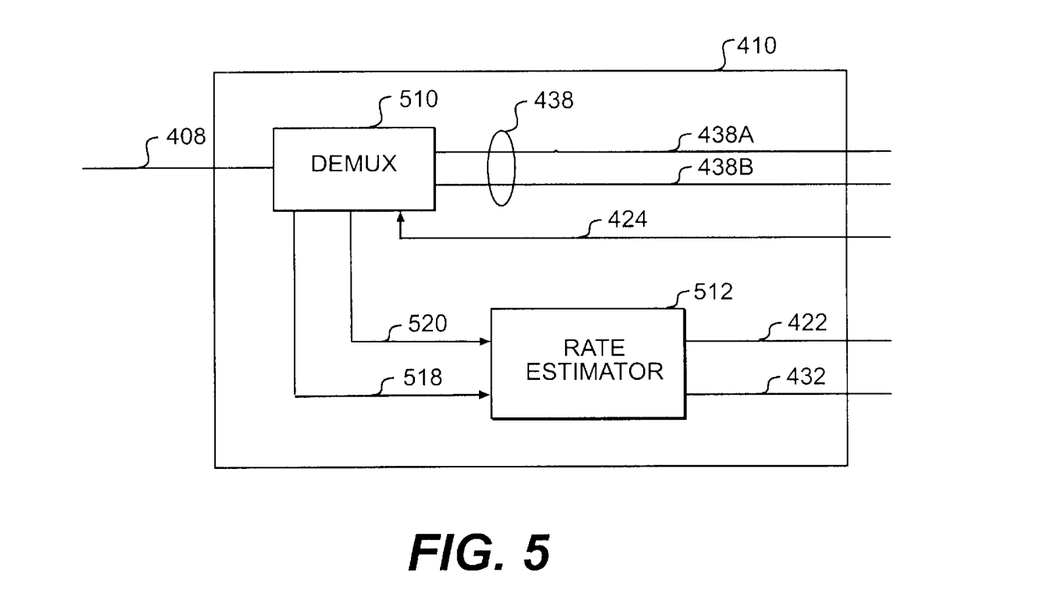
FIG. 5 is a block diagram depicting one embodiment of demux 410 of FIG. 4.

FIG. 5 shows demux 410 of FIG. 4 in greater detail. Demux 410 receives TCP packets on path 408 and buffer fill and size information on path 424. The TCP packets are demultiplexed and sent to ABR connection buffers 414 via path 438b, and stored at the address indicated by an address sent via path 438a.

Demultiplexer 510 also outputs start of packet indication information on path 520 and connection ID information over path 518. Rate estimator 512 receives and stores start of packet indication information and connection ID information from demultiplexer 510 via paths 518 and 520, respectively. From this information, rate estimator 512 calculates rate information for each connection and stores it. TCP window calculator 420 sends current connection ID information via path 432, and rate estimator 512 responds by outputting rate information for the connection via path 422 to new TCP window calculator 420.

Figure 6:
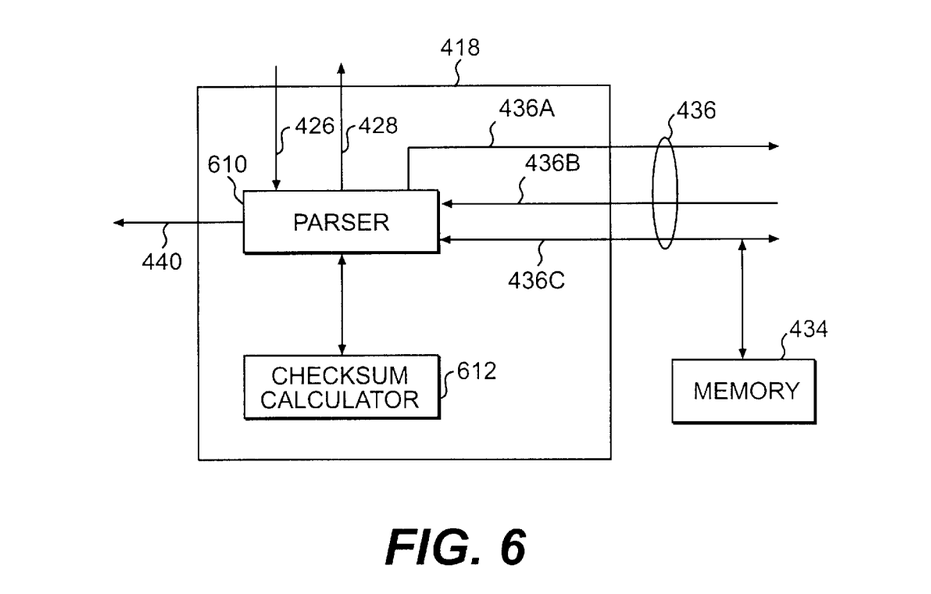
FIG. 6 is a block diagram depicting one embodiment of header parser 418 of FIG. 4.

FIG. 6 is a block diagram showing header parser 418 of FIG. 4 in greater detail.

Header parser 418 comprises of parser 610, checksum calculator 612, and paths connecting parser 610 to buffer system 220 and SAR 222. When SAR 222 has completed assembling a packet in memory 434, header parser 418 is notified over path 436b. In response to notification that the packet is ready, parser 610 retrieves the header information from the packet stored in memory 434 via path 436c and transfers the TCP packet header to new TCP window calculator 420 via path 428.

The new TCP window is transferred over path 426 to parser 610. Because the TCP header information has been altered, a new checksum is preferably calculated by checksum calculator 612. The new TCP window and new checksum are inserted into the packet, which is transferred to buffer system 220 over path 440. Finally, after the packet has been transferred, parser 610 notifies SAR 222 via path 436a that the memory area for the transferred packet is now available.

If the "far end" TCP source does not send any packets for a specific amount of time, a window advertisement packet is generated for the connection and sent to the "near end" TCP source. This is done because the available bit rate on the ATM link is very dynamic, thus making old window size information useless.

Since TCP allows a source to advertise its window size (the number of bytes it can accept), the present invention uses TCP in a standards supported way. These actions are, therefore, transparent to both TCP sources. This invention allows TCP users on standard LAN's to reap the benefits of TCP/ABR when the connection is partially carried over ATM.

Figure 7:
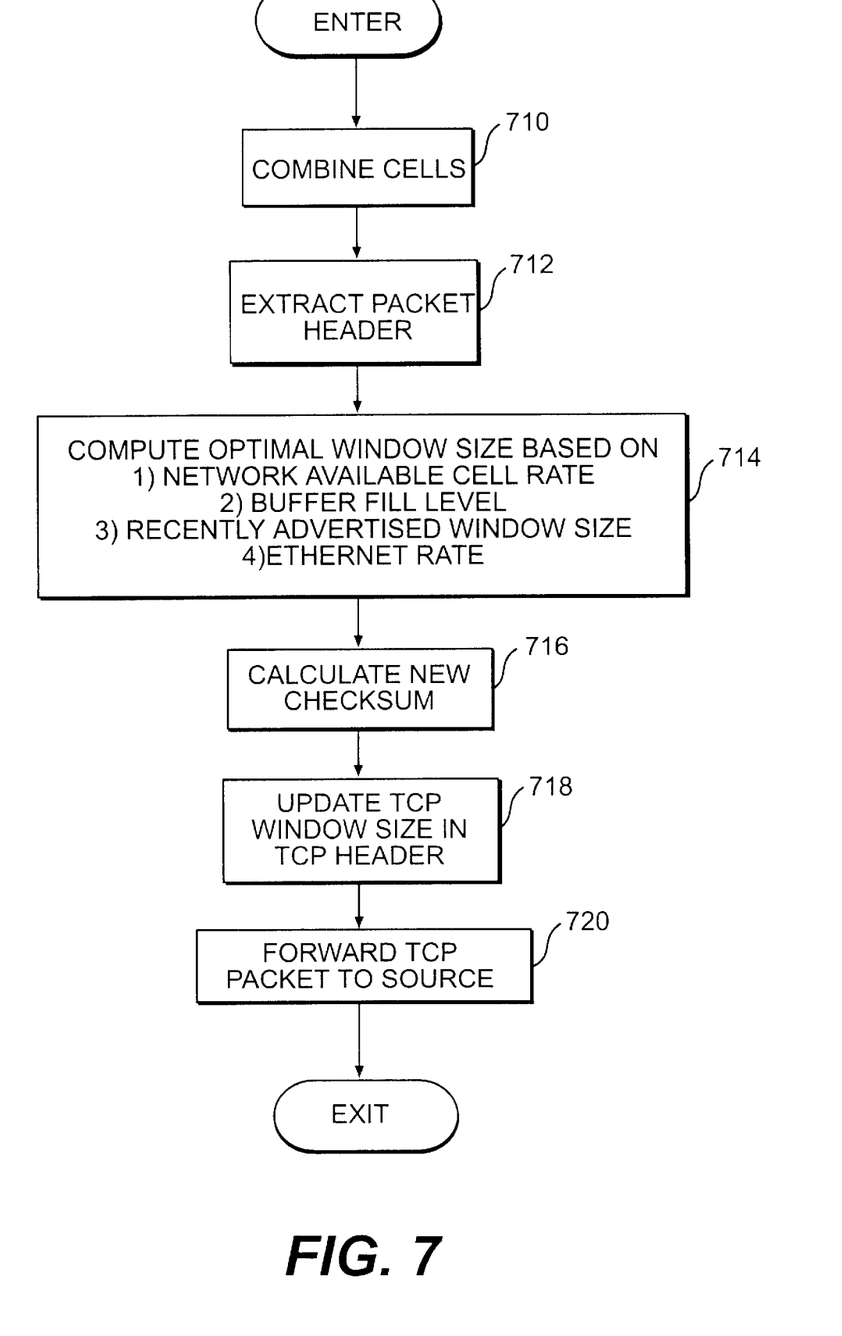
FIG. 7 is a flow chart showing the operation of the system of FIG. 4.

FIG. 7 is a flow chart showing the overall processing of the apparatus of FIG. 4. First, header parser 418 combines ATM cells together (step 710) to extract the TCP packet header from the grouping (step 712). The switch has an estimate of the most current Available Cell Rate in the network advertised to it by the network via ATM backward RM cells received via path 430. This corresponds to the explicit rate feedback of the ABR flow control algorithm. Buffer fill levels and buffer sizes are received over path 424.

Based on the network resource information, new TCP window calculator 420 computes an optimal window size for the source which would cause no buffer overflow at its output port (step 714). In a preferred embodiment, network resource information may include one or more of the following: Available Cell Rate, buffer fill levels, the most recently advertised window size and the Ethernet rate. In alternative embodiments, network resource information may include other signals or data.

Checksum calculator 612 calculates a new checksum to account for the change in the header (step 716). Header parser 418 then updates the window size field in the TCP header field that it intercepted (step 718). Finally, the entire TCP packet is forwarded to the source after stuffing the modified header back and checksum into the packet (step 720).

The primary purpose of inserting a new TCP window is to set a window that optimizes throughput of ABR connection buffers 414. By optimizing throughput of ABR connection buffers 414, the benefits of TCP over ABR are extended beyond ATM network 112 to the entire TCP connection between user 116 and user 118.

Figure 8:
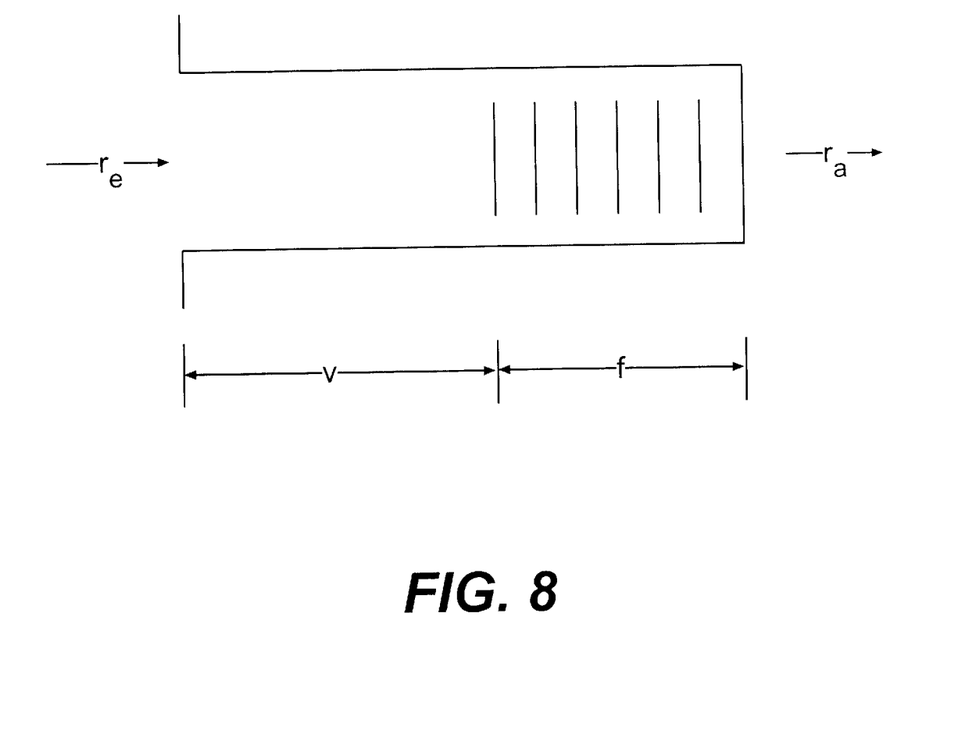
FIG. 8 is a block diagram representing a buffer.

FIG. 8 is a logical view of one of the buffers in buffers 414 of FIG. 4. To optimize throughput of ABR connection buffers 414, several factors are taken into account for each buffer. $r_e$ equals the rate of data flow from the Ethernet LAN 110, $r_a$ equals the rate of data flow out of the buffer to ATM network 112, f equals to the fullness of the buffer, and v equals the vacancy of the buffer. T represents the time necessary for the buffer 414 to fill to its maximum level. Therefore, the steady state of the buffer can be represented as $$r_e T + f = v + f + r_a T \qquad \text{Eqn. 1}$$

$$T = \frac{v}{r_e - r_a} \qquad \text{Eqn. 2}$$

W represents the TCP window, then $$W = r_e T = \frac{v\, r_e}{r_e - r_a} \qquad \text{Eqn. 3}$$

New TCP window calculator 420 chooses the new window size as follows:

If $r_e > r_a$, then $W = r_e T$ (Eqn. 3).

If $r_e \leq r_a$, then $W = \infty$.

After W is calculated, then the minimum of W and $W_{advertised}$ is inserted as the new TCP congestion window. Because $W_{advertised}$, which is sent by the receiver, is the maximum window beyond which the transmitter's window cannot increase, the new window algorithm set forth above effectively places an upper limit on the window so the TCP sliding window algorithm will not overshoot and drop to zero. Consequently, the curve of FIG. 3 becomes much more even, and does not abruptly change as it does with the normal TCP protocol. By adjusting the TCP window based on parameters in the network instead of strictly according to the TCP protocol, the TCP connection is optimized to take advantage of the throughput increase of TCP over ABR.

Figure 9:
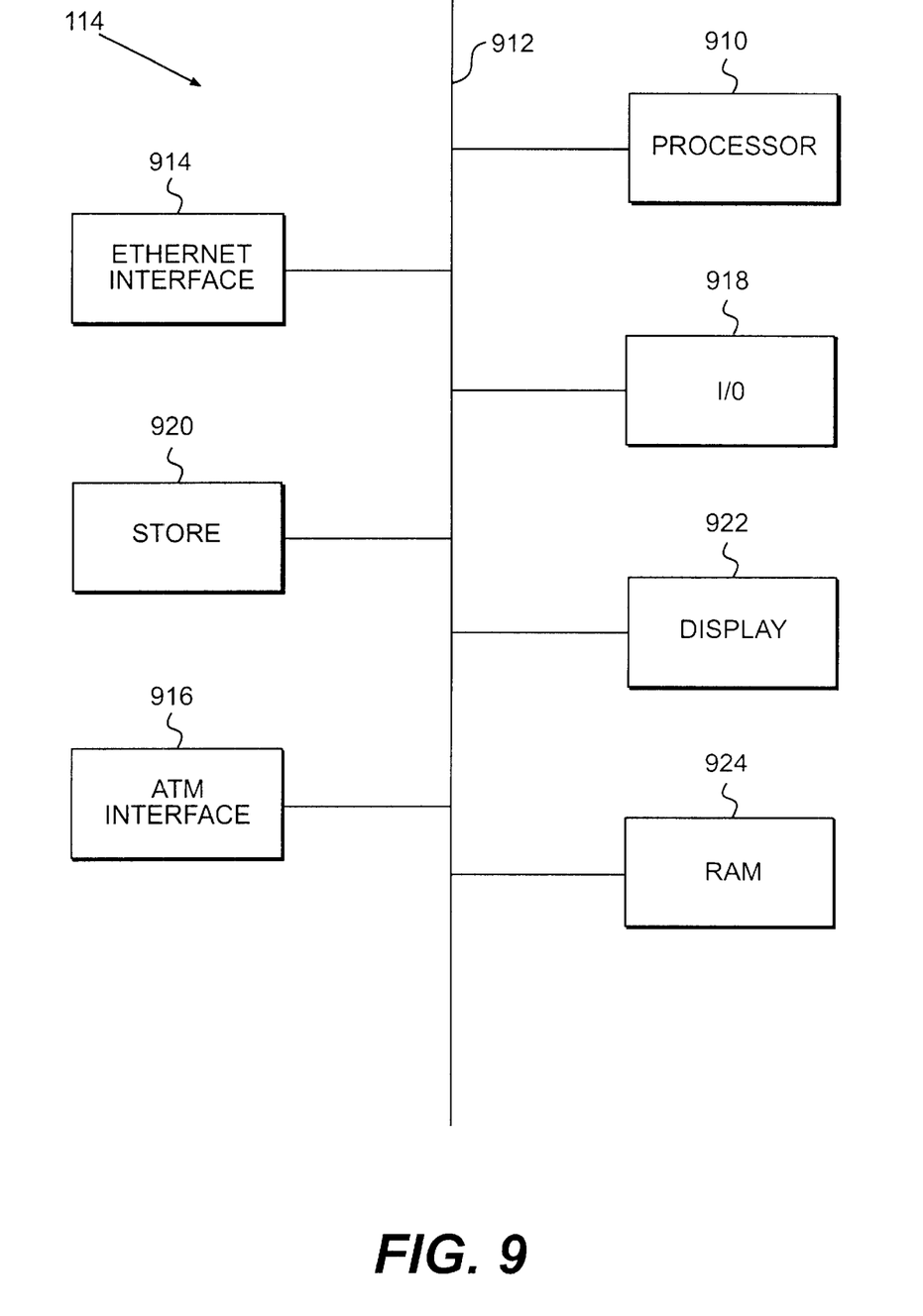
FIG. 9 is a block diagram of one embodiment of components for implementing methods and apparatus consistent with the present invention.

FIG. 9 shows a computer system which may be used to implement switch 114 consistent with the principles of the present invention. Switch 114 is driven by a processor 910, which is connected to several storage and interfacing devices via a bus 912. Storage devices include a mass store 920, a RAM 924, and memory in processor 910 (not shown). These storage devices store some or all of the programs and data necessary for carrying out the functions of the preferred embodiments of the invention.

Switch 114 also includes at least one Ethernet interface 914 and ATM interface 916. Ethernet interface 914 and ATM interface 916 respectively correspond to Ethernet physical interfaces 210 and 218 and ATM physical interfaces 216 and 226 of FIG. 2. Although switch 114 preferably includes several network interfaces, only one example of each is included in FIG. 9 for clarity. Interfaces 914 and 916 include hardware and software necessary to carry out interfacing between switch 114 and the networks.

Input/output 918 is provided and may comprise any well-known communications adaptor or user peripheral interface. A display 922 displays information related to the operation of switch 114 and may comprise, for example, a simple LCD display or a more complex graphical user interface. Store 920 in a preferred embodiment comprises a hard disk drive, but may also be implemented using a RAID system, tape drive, disk drive or other storage device.

Methods and apparatus consistent with the invention may be embodied in software executing on processor 910. The executing software interacts with network physical interfaces 914 and 916 to modify the TCP window as described above. The software may be embodied on any media usable by processor 910, such as store 920. For example, the media may be a disk readable and usable by processor 910. The media may also be a transmission medium, such as the Internet.

Apparatus and methods consistent with the present invention therefore extend the advantages realized by TCP over ABR to TCP connections across both ATM and non-ATM networks. The TCP three phase congestion control protocol is effectively bypassed, thus removing the disruptive swings shown in FIG. 3. Consequently, the methods and apparatus consistent with the present invention provide throughput over a TCP connection that closely follows the throughput made available by the TCP over ABR.

V. CONCLUSION

Other embodiments of the invention will be apparent to those skilled in the art from consideration of the specification and practice of the disclosed embodiments. The specification and examples are exemplary only, and the true scope and spirit of the invention is defined by the following claims and their equivalents.

It will be apparent to those skilled in the art that various modifications and variations can be made in the apparatus and methods of the present invention and in its construction of this without departing from the scope or spirit of the invention.

The principles of the methods and apparatus in accordance with the present invention can be used in a variety of ways. For example, the methods and apparatus use the general technique of modifying congestion control information outside the normal modification of the information as set forth in the protocol. The methods and apparatus also modify the congestion control information based on resources in the system. Finally, the methods and apparatus also use congestion information from one protocol to modify congestion control information of another protocol.

The principles can also be extended to other combinations of networks, and other combinations of protocol. The principles of the methods and apparatus disclosed herein are not limited to Ethernet LANs and ATM networks, but can be expanded to be used on any system having disparate networks consistent with the principles of the networks disclosed herein. The principles of the methods and apparatus disclosed herein are also not limited to TCP and ATM protocols, but can be expanded to be used on any system having disparate protocols.

The principles can also be used in system other than window-based congestion control systems. Accordingly, systems and methods consistent with the invention might replace first congestion control information, developed in accordance with a first protocol, with congestion control information developed according to resource information, second protocol congestion information, or a combination of resource information and second protocol congestion information.

We claim:

1. A method of optimizing a connection that employs Transport Control Protocol ("TCP") that utilizes first congestion information for controlling the connection, comprising:

receiving first congestion information defined by the TCP, the first congestion information including TCP advertised window information;

receiving network resource information not provided by the TCP;

determining second congestion information based on the network resource information; and transmitting one of the first and second congestion information.

2. A method of optimizing a connection that utilizes a source, a destination, Transfer Control Protocol ("TCP") and a second protocol, comprising: transmitting first congestion information from a first entity to a second entity;

receiving the first congestion information, the first congestion information including TCP advertised window information;

receiving network resource information not provided by the TCP;

determining second congestion information based on the network resource information;

transmitting one of the first and second congestion information to the second entity; and transmitting data from the second entity based on one of the first and second congestion information.

3. A system for optimizing a connection that employs Transfer Control Protocol ("TCP") utilizing first congestion information for controlling the connection, comprising:

means for receiving first congestion information including TCP advertised window information defined by the TCP;

means for receiving network resource information not provided by the TCP;

means for determining second congestion information based on the network resource information; and means for transmitting one of the first and second congestion information.

4. A system for optimizing a connection that utilizes a source, a destination, Transfer Control Protocol ("TCP") and a second protocol, comprising: means for transmitting first congestion information from a first entity to a second entity;

means for receiving the first congestion information including TCP advertised window information;

means for receiving network resource information not provided by the TCP;

means for determining second congestion information based on the network resource information;

means for transmitting one of the first and second congestion information to the second entity; and means for transmitting data from the second entity based on one of the first and second congestion information.

5. Media having embodied thereon program code executable for performing method of optimizing a connection that Transfer Control Protocol ("TCP") utilizing first congestion information defined by the TCP for controlling the connection, the method comprising:

receiving the first congestion information including TCP advertised window information;

receiving network resource information not provided by the TCP;

determining second congestion information based on network resource information; and transmitting one of the first and second congestion information.

6. The method according to claim 1, wherein the step of receiving network resource information includes a substep of receiving buffer information.

7. The method according to claim 1, wherein the step of receiving resource information includes a substep of receiving rate information.

8. The method according to claim 7, wherein the substep of receiving rate information includes a substep of receiving incoming data rate information.

9. The method according to claim 7, wherein the substep of receiving rate information includes a substep of receiving available network data rate information.

10. The method according to claim 1, further including the step of comparing the first congestion information with the second congestion information.

11. The method according to claim 1, wherein the connection also uses Asynchronous Transfer Mode protocol, and the step of receiving network resource information includes the substep of receiving cell rate information.

12. The method according to claim 1, wherein the step of receiving network resource information includes the substep of receiving Resource Management cells.

13. The method according to claim 2, wherein the step of receiving network resource information includes a substep of receiving buffer information.

14. The method according to claim 2, wherein the step of receiving network resource information includes a substep of receiving rate information.

15. The method according to claim 14, wherein the substep of receiving rate information includes a substep of receiving incoming data rate information.

16. The method according to claim 14, wherein the substep of receiving rate information includes a substep of receiving available network data rate information.

17. The method according to claim 2, further including the step of comparing the first congestion information with the second congestion information.

18. The method according to claim 2, wherein the connection also uses Asynchronous Transfer Mode protocol, and the step of receiving network resource information includes the substep of receiving cell rate information.

19. The method according to claim 2, wherein the step of receiving network resource information includes the substep of receiving Resource Management cells.

20. The system according to claim 3, wherein the means for receiving network resource information includes means for receiving buffer information.

21. The system according to claim 3, wherein the means for receiving network resource information includes means or receiving rate information.

22. The system according to claim 21, wherein the means for receiving rate information includes means for receiving incoming data rate information.

23. The system according to claim 21, wherein the means for receiving rate information includes means for receiving available network data rate information.

24. The system according to claim 3, further comprising means for comparing the first congestion information with the second congestion information.

25. The system according to claim 3, wherein the connection also uses Asynchronous Transfer Mode protocol, and the means for receiving network resource information includes means for receiving cell rate information.

26. The system according to claim 3, wherein the means for receiving network resource information includes means for receiving Resource Management cells.

27. The system according to claim 4, wherein the means for receiving network resource information includes means for receiving buffer information.

28. The system according to claim 4, wherein the means for receiving network resource information includes means for receiving rate information.

29. The system according to claim 28, wherein the means for receiving rate information includes means for receiving incoming data rate information.

30. The system according to claim 28, wherein the means for receiving rate information includes means for receiving available network data rate information.

31. The system according to claim 4, further including the means for comparing the first congestion information with the second congestion information.

32. The system according to claim 4, wherein the connection also uses Asynchronous Transfer Mode protocol, and the means for receiving network resource information includes means for receiving cell rate information.

33. The system according to claim 4, wherein the means for receiving network resource information includes means for receiving Resource Management cells.

34. The media according to claim 5, wherein the step of receiving network resource information includes a substep of receiving buffer information.

35. The media according to claim 5, wherein the step of receiving network resource information includes a substep of receiving rate information.

36. The media according to claim 35, wherein the substep of receiving rate information includes a substep of receiving incoming data rate information.

37. The media according to claim 35, wherein the substep of receiving rate information includes a substep of receiving available network data rate information.

38. The media according to claim 5, further including the step of comparing the first congestion information with the second congestion information.

39. The media according to claim 5, wherein the connection also uses Asynchronous Transfer Mode protocol, and the step of receiving network resource information includes the substep of receiving cell rate information.

40. The media according to claim 5, wherein the step of receiving network resource information includes the substep of receiving Resource Management cells.

41. The method of claim 1, wherein the second congestion information is an optimized TCP window size reflecting an overall flow of data for the connection.

42. The method of claim 2, wherein the second congestion information is an optimized TCP window size reflecting an overall flow of data for the connection.

43. The system of claim 3, wherein the means for determining second congestion information further includes means for determining an optimized TCP window size reflecting an overall flow of data for the connection.

44. The system of claim 4, wherein the means for determining second congestion information further includes means for determining an optimized TCP window size reflecting an overall flow of data for the connection.

45. The media of claim 5, wherein the step of determining second congestion information further includes the step of determining an optimized TCP window size reflecting an overall flow of data for the connection.

46. A system for optimizing a connection that utilizes a source, a destination, Transfer Control Protocol ("TCP") and a second protocol, the system comprising:

the source capable of transmitting data in the TCP protocol to the destination;

demultiplexer capable of
 receiving the data,
 determining first congestion information from the data, the first congestion information including TCP advertised window information,
 receiving network resource information not provided by the TCP, and
 determining second congestion information based on the network resource information; and a processor capable of
 receiving the first and second congestion information from the demultiplexer and determining an optimum window size, and
 transmitting the optimum window size to the source.

47. The system of claim 41, wherein the source is further capable of transmitting data based on the optimum window size.

* * * * *

UNITED STATES PATENT AND TRADEMARK OFFICE
CERTIFICATE OF CORRECTION

PATENT NO. : 6,370,114 B1
DATED : April 9, 2002
INVENTOR(S) : Jeffrey T. Gullicksen et al.

It is certified that error appears in the above-identified patent and that said Letters Patent is hereby corrected as shown below:

Column 13,
Line 5, after "receiving" insert -- network --.
Line 55, change "or receiving" to -- for receiving --.

Column 16,
Line 13, change ":ckaim 41" to -- claim 46 --.

Signed and Sealed this

Thirtieth Day of July, 2002

Attest:

Attesting Officer

JAMES E. ROGAN
Director of the United States Patent and Trademark Office